Aug. 4, 1931.  J. S. GEORGE  1,816,839
FLOOR MARKER
Filed Oct. 2, 1929
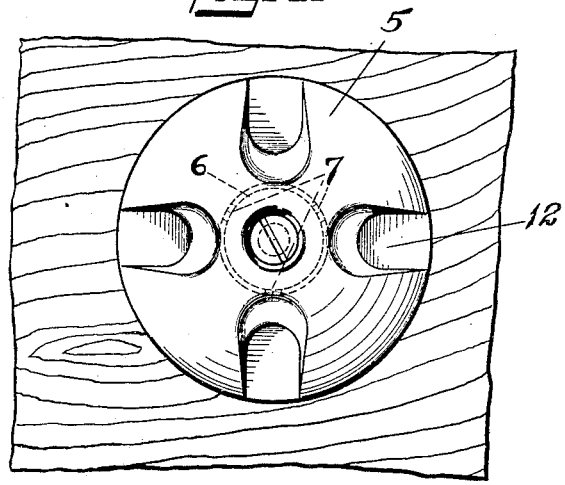
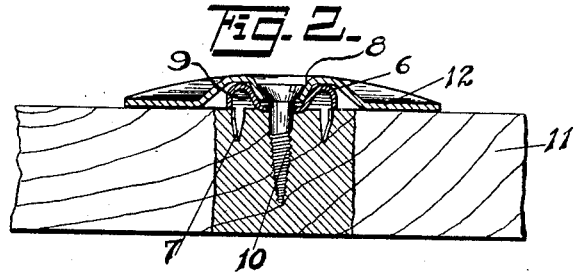
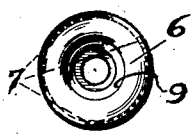
Inventor
James S. George
By his Attorneys Patented Aug. 4, 1931

1,816,839

UNITED STATES PATENT OFFICE

JAMES S. GEORGE, OF WATERBURY, CONNECTICUT, ASSIGNOR TO SCOVILL MANUFACTURING COMPANY, OF WATERBURY, CONNECTICUT, A CORPORATION OF CONNECTICUT

FLOOR MARKER

Application filed October 2, 1929. Serial No. 396,635.

This invention relates to floor markers.

So-called street markers have been used to indicate traffic lines on paved streets. These ordinarily include a series of marking heads of brass or the like and means for anchoring the individual heads to the pavement. One of the purposes of such markers is to avoid the necessity of frequent repainting of painted lines.

It is sometimes desirable similarly to indicate traffic or regional lines on factory floors but the usual form of street marker is not suitable on account of the different conditions.

It is an object of the present invention to provide an economical and effective marker particularly suitable for use on wood floors.

With this general object in view, the invention consists in the features, combinations, details of construction, and arrangements of parts which will first be described in connection with the accompanying drawings and then more particularly pointed out.

In the drawings:

Figure 1 is a top plan view of a marker constructed in accordance with the invention;

Figure 2 is a vertical sectional view of the same; and

Figure 3 is a plan view of the anchoring element before assembly of the head.

Referring to the drawings, the marker here illustrated as an example comprises a domed marking head 5 which may be conveniently formed of brass. Associated with the head, but separate therefrom, is an anchoring element 6. The anchoring element is considerably smaller in diameter than the head and is provided with a plurality of downwardly extending prongs 7. In the present embodiment three such prongs are used and these are equally spaced about the edge of the anchoring element. The prongs shown are integral with the body of the anchoring element and are formed of hardened steel.

The head 5 has a dished or cupped central portion 8 which fits into a corresponding dished portion 9 formed in the anchoring element (Fig. 2).

The head 5 and the anchoring element 6 have alined central holes for the passage of a securing element such as the screw 10.

To instal the device described, the anchoring element 6 is first anchored in place by forcing its prongs 7 into the floor 11, as indicated in Fig. 2. Then the head is assembled in position with its dished central portion 8 fitting into the dished portion 9 of the anchoring element. Finally, the head is fastened down by the screw 10 which is passed through the alined holes and screwed into the floor.

Any side thrust, as by the passage of a truck, is taken primarily by the anchoring element. While the screw 10 may aid in resisting side thrust to some extent, it could not serve that purpose alone. The primary function of the screw is to center the head, in conjunction with the mutually engaging dished portions, and to hold the head down to the floor.

In the embodiment here illustrated as an example the domed head 5 is formed with a plurality of radial ribs 12 which, as indicated in the drawings, have flat bases. These ribs provide additional floor-bearing surface for the head and strengthen the head against the weight and pressure of passing traffic.

With the construction described, the hardened steel prongs can be driven into the floor to full depth even though at least one prong must hit against the grain. At the same time the head has the relative cheapness and high visibility of brass.

It will be understood that the desired traffic or regional lines are formed by a row of the markers described.

What is claimed is:

1. In a floor marker, and in combination, an anchoring element having a plurality of prongs capacitated to be driven into a floor and formed with a dished central portion, a head for marking association with the floor, formed with a dished portion fitting into the corresponding dished portion of the anchoring element, said anchoring element and head having alined central holes, and a screw passing through said holes to be screwed into the floor, thereby to hold down the head.

2. In a floor marker, and in combination, an anchoring element having a plurality of prongs capacitated to be driven into a floor, a domed head for marking association with the floor, said head having a plurality of radial ribs on its under side for engagement with the floor, and means for centering the head with respect to the anchoring element and for holding it to the floor.

3. In a floor marker of the character described, an anchoring plate formed with a plurality of prongs capacitated to be driven into a floor and provided with a dished central portion, a head for marking association with the floor formed with a dished portion fitting over and into the dished portion of the anchoring plate, said anchoring plate and head having alined central apertures, and a fastener passing through said apertures and adapted to be driven into the floor and acting to hold the head in close association with the floor.

4. In a floor marker of the character described, an anchoring plate having a plurality of prongs capacitated to be driven into a floor and formed with a dished central portion, a head for marking association with the floor formed with a dished portion fitting into the corresponding dished portion of the anchoring plate, said head having a relatively wide flange formed with a plurality of radial ribs on its under side for engagement with the floor, and means for centering the head with respect to the anchoring plate for holding the flange of the head in close association with the floor.

In testimony whereof, I have hereunto set my hand.

JAMES S. GEORGE.